US010922415B2

(12) United States Patent
Thorsen

(10) Patent No.: US 10,922,415 B2
(45) Date of Patent: Feb. 16, 2021

(54) METHOD AND SYSTEM FOR FAIL-SAFE BOOTING

(71) Applicant: Oniteo AB, Kista (SE)

(72) Inventor: Hans Thorsen, Lidingö (SE)

(73) Assignee: ONITEO AB, Kista (SE)

( * ) Notice: Subject to any disclaimer, the term of this patent is extended or adjusted under 35 U.S.C. 154(b) by 159 days.

(21) Appl. No.: 16/300,268

(22) PCT Filed: May 8, 2017

(86) PCT No.: PCT/SE2017/050460
§ 371 (c)(1),
(2) Date: Nov. 9, 2018

(87) PCT Pub. No.: WO2017/196237
PCT Pub. Date: Nov. 16, 2017

(65) Prior Publication Data
US 2019/0147166 A1    May 16, 2019

(30) Foreign Application Priority Data
May 13, 2016 (SE) .................... 1650648-7

(51) Int. Cl.
*G06F 21/57* (2013.01)
*G06F 21/50* (2013.01)
(Continued)

(52) U.S. Cl.
CPC .......... *G06F 21/575* (2013.01); *G06F 3/0604* (2013.01); *G06F 3/0659* (2013.01);
(Continued)

(58) Field of Classification Search
CPC ........ G06F 21/57; G06F 21/575; G06F 21/50; G06F 21/572; G06F 11/1417;
(Continued)

(56) References Cited

U.S. PATENT DOCUMENTS 6,038,663 A * 3/2000 Feldman ............. G06F 15/7814
713/1
6,185,678 B1   2/2001 Arbaugh et al.
(Continued)

FOREIGN PATENT DOCUMENTS

| EP | 1 324 198 A2 | 7/2003 |
| GB | 2477774 A | 8/2011 |
| WO | WO-03/030434 A2 | 4/2003 |

OTHER PUBLICATIONS

Extended European search report dated Oct. 21, 2019 issued in European patent application No. 17796490.5.

*Primary Examiner* — Kristine L Kincaid
*Assistant Examiner* — Shaqueal D Wade
(74) *Attorney, Agent, or Firm* — Faegre Drinker Biddle & Reath LLP

(57) ABSTRACT

Computer unit includes ROM arrangement including port check code and boot ROM code, internal memory, fixed storage media including fixed media boot application FSMBA, removable media port and processor. The processor is adapted to use the boot ROM code to start the computer unit, use the port check code to determine that removable storage media is present on the removable media port, and use the boot ROM code to load any objects present on the removable storage media into the internal memory, use the boot ROM code to verify the integrity of the objects loaded into the internal memory, use the boot ROM code to verify that the objects loaded into the internal memory include removable media boot application RSMBA, boot the computer unit using the RSMBA, and continue the operation of the computer unit by loading payload from the fixed storage media into the internal memory.

12 Claims, 7 Drawing Sheets

(51) Int. Cl.
*G06F 21/79* (2013.01)
*G06F 3/06* (2006.01)
*G06F 9/4401* (2018.01)
*G06F 13/10* (2006.01)
*G06F 11/16* (2006.01)

(52) U.S. Cl.
CPC .......... *G06F 3/0673* (2013.01); *G06F 9/4411* (2013.01); *G06F 21/50* (2013.01); *G06F 21/79* (2013.01); *G06F 11/16* (2013.01); *G06F 13/10* (2013.01); *G06F 2221/034* (2013.01)

(58) Field of Classification Search
CPC ...... G06F 11/14; G06F 3/0604; G06F 3/0659; G06F 3/0673
See application file for complete search history.

(56) References Cited

U.S. PATENT DOCUMENTS

| | | |
|---|---|---|
| 6,775,768 B1 | 8/2004 | Raspe |
| 6,920,553 B1 * | 7/2005 | Poisner ................. G06F 9/4401 713/1 |
| 7,853,780 B2 * | 12/2010 | Rotondo ................. G06F 21/00 713/2 |
| 8,868,898 B1 | 10/2014 | Van Hoof |
| 9,230,112 B1 | 1/2016 | Peterson et al. |
| 9,870,220 B2 * | 1/2018 | Lerman ................... G06F 8/654 |
| 2004/0064457 A1 | 4/2004 | Zimmer et al. |
| 2006/0015717 A1 | 1/2006 | Liu et al. |
| 2010/0031012 A1 | 2/2010 | Rotondo et al. |
| 2014/0089651 A1 | 3/2014 | Yao et al. |
| 2016/0080342 A1 | 3/2016 | Krauss et al. |

\* cited by examiner

METHOD AND SYSTEM FOR FAIL-SAFE BOOTING

CROSS-REFERENCE TO PRIOR APPLICATIONS

This application is a § 371 National Stage Application of PCT International Application No. PCT/SE2017/050460 filed May 8, 2017, which claims priority to Swedish Application No. 1650648-7 filed on May 13, 2016, both of which are incorporated herein in their entirety.

TECHNICAL FIELD

The present disclosure relates generally to computer units and methods in computer units.

BACKGROUND

Much attention has been given to the issue of computer security in recent years. Many efforts for improving computer security have been direct toward software protection and combating software threats such as viruses, "Trojan horse" attacks and other malicious software attacks. Several solutions have been put forth to deal with software protection such as the concept of "trusted software" and to obtain "software integrity" to ensure reliable systems that operate under an established security policy for the system. "Trusted software" relates to the idea of ensuring that the installed software can be trusted by the customer and was free from tampering by unauthorized persons. Major efforts have been directed into developing software security products designed to deal with viruses and malicious software that can infect computer systems.

Although many software security products do effectively detect, prevent, and remove viruses, they do so while running on top of the operating system, and confidence that the security is maintained depends on whether it can be reasonably established that the operating system has not been compromised during the booting process. Patents such as U.S. Pat. No. 6,185,678 describe methods to provide a secure booting process where the integrity of the booting process is ensured by an architecture that initializes a computer system using public key cryptography.

The concept of "resilience to failure" refers to the ability of computer units to recover from a catastrophic software failure. For example, there is a need for the ability to cope with a situation where software hangs from e.g. code bugs or corrupt data. A suitable mechanism is required that would enable the unit to recover and begin operating again while the unit is operating in the field, preferably without the need of assistance by service personnel.

SUMMARY

The above described problems are addressed by a computer unit comprising: a read-only memory ROM arrangement comprising port check code and boot ROM code, an internal memory, a fixed storage media comprising a fixed media boot application FSMBA, a removable media port and at least one processor. The at least one processor is adapted to: use the boot ROM code to start the computer unit, use the port check code to determine that a removable storage media is present on the removable media port, use the boot ROM code to load any objects present on said removable storage media into the internal memory, use the boot ROM code to verify the integrity of said objects loaded into the internal memory, use the boot ROM code to verify that said objects loaded into the internal memory comprise a removable media boot application RSMBA, boot the computer unit using said RSMBA, and continue the operation of the computer unit by loading payload from the fixed storage media into the internal memory. This enables a tamper-proof booting process with a low amount of code in the ROM arrangement.

The above described problems are further addressed by a computer unit comprising a ROM arrangement and a removable media port. The ROM arrangement is adapted to: start the computer unit, determine whether a removable storage media is present on the removable media port, verify the integrity of any removable media boot application RSMBA present on said removable storage media, and boot the computer unit using said RSMBA.

The at least one processor may further be adapted to verify the integrity of payload objects on the fixed storage media by: loading a payload map from the fixed storage media into the internal memory, verifying the integrity of the payload map, determining the algorithm or algorithms used to generate the payload map, applying said determined algorithm or algorithms to the payload objects and receiving a result, comparing said result to the payload map, and verifying the integrity of the payload objects if said result corresponds to the payload map. This enables a chain of trust to be verified back to the tamper-proof ROM arrangement.

The above described problems are further addressed by a computer unit comprising an internal memory and at least one processor. The at least one processor is adapted to verify the integrity of payload objects by: loading a payload map into the internal memory, verifying the integrity of the payload map, determining the algorithm or algorithms used to generate the payload map, applying said determined algorithm or algorithms to the payload objects and receiving a result, comparing said result to the payload map, and verifying the integrity of the payload objects if said result corresponds to the payload map. In this computer unit, the initial booting may take place in a different way than described above, e.g. according to the prior art booting process described in connection with FIG. 1.

The above described problems are further addressed by a method in a computer unit comprising a ROM arrangement comprising port check code and boot ROM code, an internal memory, a fixed storage media comprising a fixed media boot application FSMBA, a removable media port and at least one processor. The method comprises: starting the computer unit, using the boot ROM code, determining that a removable storage media is present on the removable media port, using the port check code, loading any objects present on said removable storage media into the internal memory, using the boot ROM code, verifying the integrity of said objects loaded into the internal memory, using the boot ROM code, verifying that said objects loaded into the internal memory comprise a removable media boot application RSMBA, using the boot ROM code, booting the computer unit, using the RSMBA, and continuing the operation of the computer unit by loading payload from the fixed storage media into the internal memory. This enables a tamper-proof booting method for a computer unit having a low amount of code in the ROM arrangement.

The above described problems are further addressed by a method in a computer unit comprising a ROM arrangement and a removable media port. The method comprises: starting the computer unit, determining whether a removable storage media is present on the removable media port, verifying the integrity of any removable media boot application RSMBA present on said removable storage media, and booting the computer unit, using the RSMBA.

The above described methods may further comprise verifying the integrity of payload objects on the fixed storage media by: loading a payload map from the fixed storage media into the internal memory, verifying the integrity of the payload map, determining the algorithm or algorithms used to generate the payload map, applying said determined algorithm or algorithms to the payload objects and receiving a result, comparing said result to the payload map, and verifying the integrity of the payload objects if said result corresponds to the payload map. This enables a chain of trust to be verified back to the tamper-proof ROM arrangement.

The above described problems are further addressed by a method in a computer unit comprising a ROM arrangement, an internal memory and at least one processor. The method comprises: loading a payload map into the internal memory, verifying the integrity of the payload map, determining the algorithm or algorithms used to generate the payload map, applying said determined algorithm or algorithms to the payload objects and receiving a result, comparing said result to the payload map, and verifying the integrity of the payload objects if said result corresponds to the payload map. According to this method, the initial booting may take place in a different way than described above, e.g. according to the prior art booting process described in connection with FIG. 1.

In embodiments, the integrity of the objects, the payload map and/or the removable media boot application RSMBA is verified using an asymmetric algorithm. The asymmetric algorithm may comprise signature verification using a public key permanently entered into the ROM arrangement. The public key may be programmed into one of a plurality of one-time programmable read-only memory (PROM) slots.

The term computer unit is not limited to computers as such, but encompasses any type of electronic unit that requires booting, such as e.g. a computer, a server, a video gaming console, a smartphone or any other type of mobile telephone unit.

The removable media may be any type of media that can be removably connected to a computer unit, such as e.g. a USB stick, an SD card, or a CD-ROM. The removable media may also be a virtual removable media, in the case of virtualization.

The fixed media may be any type of media where permanent storage of files to be used on the computer unit is possible, such as e.g. the hard drive of the computer unit. The fixed media is not necessarily fixedly connected to the computer unit as such, but may be fixedly connected to another computer unit, such as in the case of virtualization.

The booting process may be defined as the process from the initial start-up of the computer unit until the computer unit is fully operational.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Introduction

The disclosure relates to computer units and methods in computer units. A computer unit may comprise a read-only memory ROM arrangement which comprises unchangeable, permanent code which has been entered into the ROM chip as part of the manufacturing process. The ROM arrangement may comprise boot ROM code, recovery code and updating code. The boot ROM code is used to start the computer unit.

If the boot ROM code, the recovery code and the updating code on the ROM arrangement are permanently entered into the ROM chip, the code is tamper-proof, and can therefore be implicitly trusted. However, the manufacturing process means that each line of code has a cost. Also, there is no way of updating the code without exchanging the chip, so mistakes cannot be corrected, and no upgrading is possible. For these reasons, it is desirable to keep the amount of code on the ROM arrangement as low as possible.

Figure 1:
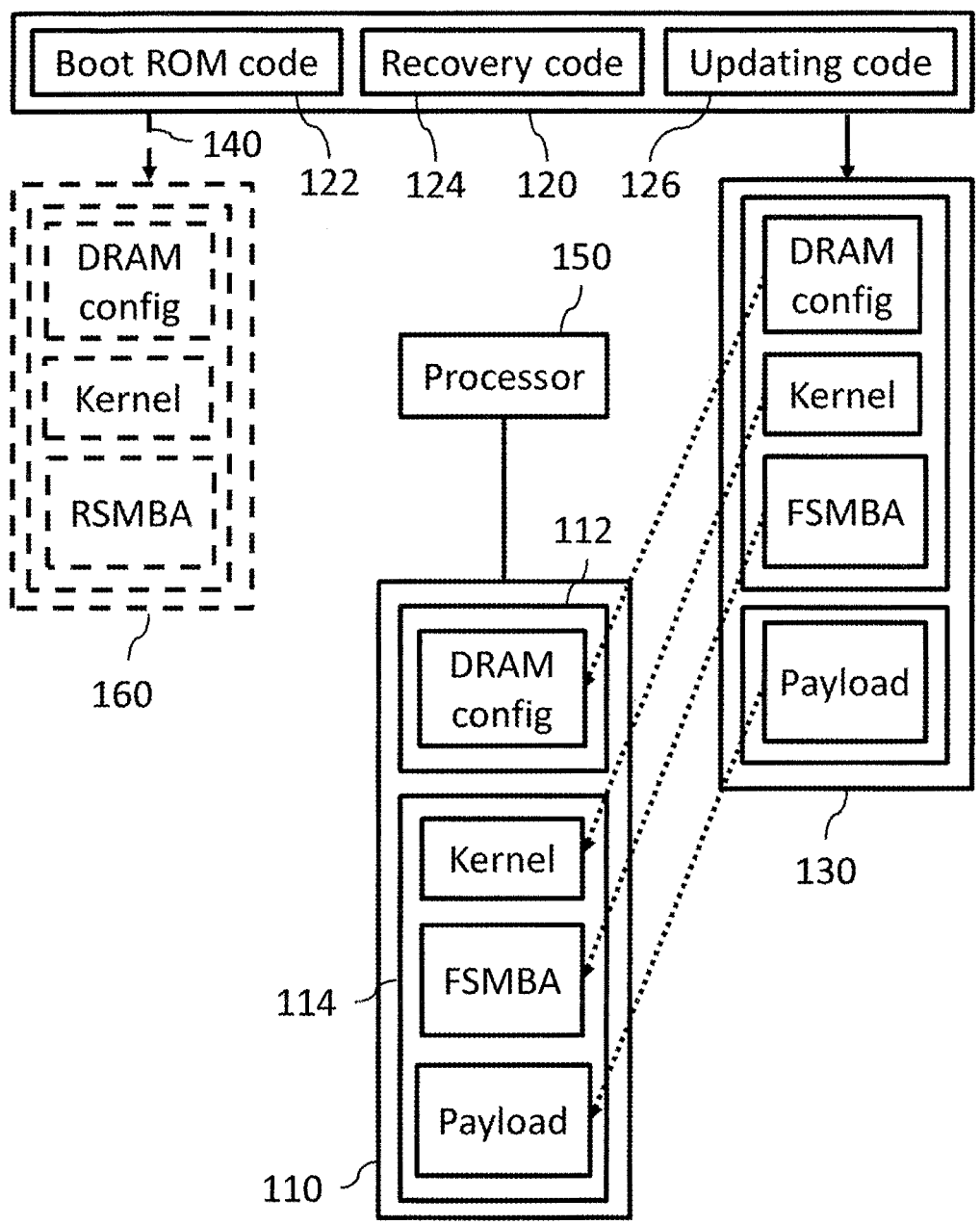
FIG. 1 shows a schematic view of a prior art booting method.

FIG. 1 shows a schematic view of a prior art booting method. A ROM arrangement 120 comprises boot ROM code 122 which is used to start the computer unit. A boot application from a fixed storage media 130 is loaded into an internal volatile memory 110, such as a RAM, and a processor 150 then boots the computer. After this initial booting, the booting process continues by downloading the payload needed for operation from the fixed storage media 130 into the internal volatile memory 110. The internal volatile memory 110 may comprise an internal static memory 112, such as a static RAM, and an internal dynamic memory 114, such as a dynamic RAM. The internal static memory 112 may be comprised in the ROM arrangement 120.

The ROM arrangement 120 further comprises recovery code 124 which may be used to download a new boot application from a removable storage media 160 present on a removable media port 140, if there are problems with the boot application on the fixed storage media 130. This new boot application may then be used for updating the boot application on the fixed storage media 130. The boot ROM arrangement 120 also comprises updating code 126 which is used to download the new boot application into the fixed storage media 130.

When a new boot application has been downloaded into the fixed storage media 130, the computer unit must be restarted, so that the updated boot application can be loaded from the fixed storage media 130 into the internal memory 110, and the processor 150 can boot the computer unit.

The ROM arrangement 120 according to the prior art must therefore comprise both recovery code 124 and updating code 126, which increases the amount of code on the ROM arrangement 120.

Embodiments

Figure 2:
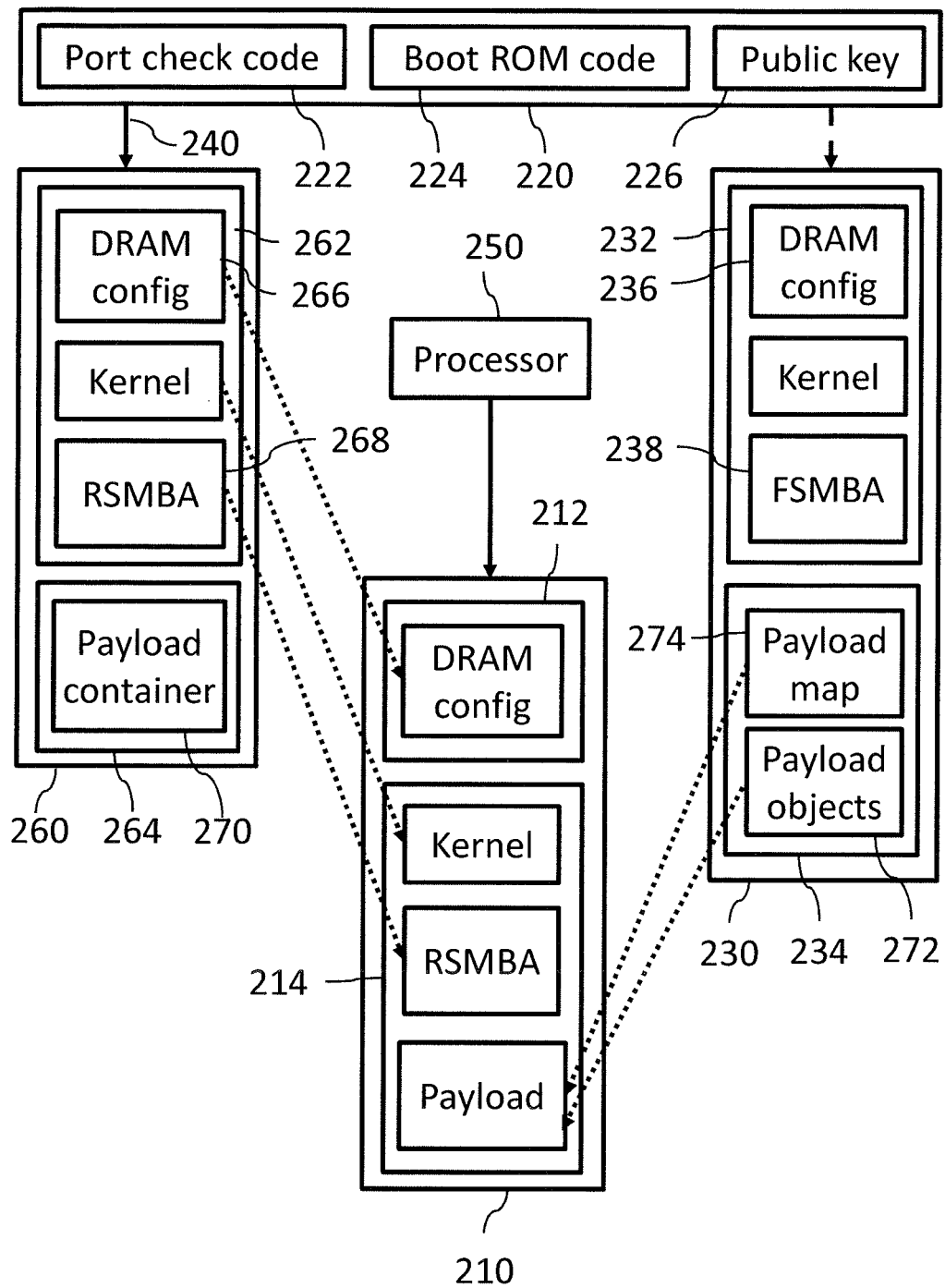
FIG. 2 shows a schematic view of a booting method in accordance with of or more embodiments of the disclosure.

FIG. 2 shows a schematic view of a booting method in accordance with of or more embodiments of the disclosure. The computer unit comprises a ROM arrangement 220, which may have a physical protection around it so that it is tamper-proof and establishes a root of trust. The ROM arrangement 220 comprises boot ROM code 224 that is used to start the computer unit, and a public key 226, which is entered into the ROM arrangement 220 in a non-reversible way. The public key 226 may be permanently entered into the ROM chip, or e.g. be programmed into a one-time programmable read-only memory (PROM) slot, of which there may be more than one in the ROM arrangement 220, so that even though the public key 226 is permanently entered into the ROM arrangement 220, it is still possible for an administrator to change the public key 226. The computer unit also comprises a processor 250, which may be comprised in the ROM arrangement 220 or be a separate arrangement.

The ROM arrangement 220 further comprises port check code 222 for determining whether a removable storage media 260 is present on a removable media port 240. If a removable storage media 260 is present on a removable media port 240, the processor 250 loads any objects present on the removable storage media 260 into an internal volatile memory 210, such as a RAM. The processor 250 then checks whether the objects have a valid signature, by verifying them using the public key 226 comprised in the ROM arrangement 220. If the processor 250 determines that the objects loaded into the internal volatile memory 210 have a valid signature and comprises a RSMBA (removable storage media boot application) 268, the processor 250 boots the computer unit using the RSMBA 268 from the removable storage media 240. After this initial booting, the booting process continues by downloading the payload needed for operation from the fixed storage media 230 into the internal volatile memory 210.

The computer unit is thus always booted using a RSMBA 268 from a removable storage media 260. Only if there is no removable storage media 260 present on any of the removable media ports 240, the computer unit is booted using a FSMBA (fixed storage media boot application) 238 from the fixed storage media 230.

In embodiments, not all removable media ports 240 are available for booting. The port check code 222 may be adapted for determining whether a removable storage media 260 is present on only one or some of the removable media ports 240.

The ROM arrangement 220 according to the disclosure thus only needs to comprise port check code 222 for determining whether a removable storage media 260 is present on a removable media port 240, in addition to the boot ROM code 224. If a removable storage media 260 is present on a removable media port 240, the computer unit is booted using the RSMBA 268 from the removable storage media 260. If no removable storage media 260 is present on any of the removable media ports 240, the computer unit is booted using a FSMBA 238 from the fixed storage media 230. There is no need for the ROM arrangement 220 to comprise a recovery application, since this may be located on the removable storage media 260. Recovery, update and factory setting functionality may e.g. be included in the RSMBA 268 on the removable storage media 260. In this case, the RSMBA 268 differs from the FSMBA 238, since there is no recovery or update functionality in the FSMBA 238. There may be different versions of the RSMBA 268 with different functionalities on different removable storage media 260—e.g. the factory setting functionality may only be included in the RSMBA 268 of some removable storage media 260 available to specific users.

If there is a removable storage media 260 present on a removable media port 240, the computer unit is booted using the RSMBA 268 from the removable storage media 240, and any recovery process needed may then also be run from the removable storage media 240, e.g. be included in the RSMBA 268. The same applies to updating applications. If no removable storage media 260 is present on any of the removable media ports 240, no recovery or update is possible anyhow, since there is in this case no new boot application available for download.

The internal volatile memory 210 may comprise an internal static memory 212, such as a static RAM, and an internal dynamic memory 214, such as a dynamic RAM. The initial part of the booting process is in this case a configuration of the internal dynamic memory 214, which is run from the internal static memory 212 using a DRAM config application 236, 266. It is however possible to use just an internal static memory 212 for the whole booting process. The internal static memory 212 may be comprised in the ROM arrangement 220, or be a separate arrangement.

The fixed storage media 230 and the removable storage media 260 may be divided into partitions. The boot application may be located in a fixed storage media boot partition 232 on the fixed storage media 230, and in a removable storage media boot partition 262 on the removable storage media, respectively. There may also be a number of other partitions on the storage medias. The removable storage media 260 may e.g. comprise a payload partition 264 comprising a payload container 270, and the fixed storage media 230 may comprise one or more payload partitions 234.

The payload container 270 may e.g. comprise a new operating system for the computer unit. In order to install this on the computer unit, the payload container 270 is downloaded into the internal volatile memory 210. The processor 250 then checks whether the payload container 270 has a valid signature, by verifying it using the public key 226 on the ROM arrangement 220. If the processor 250 determines that the payload container 270 has a valid signature, the processor 250 opens the payload container 270 and downloads the payload into a payload partition 234 on the fixed storage media 230.

The payload in the payload container 270 may comprise payload objects 272 and a signed payload map 274. The payload map 274 is a file that is used to verify that the payload objects 272 have not been tampered with. When the payload is first downloaded into the fixed storage media 230 of the computer unit, it is contained in the signed payload container 270. However, the individual objects in the payload are not signed, since the constant verification of signatures on each of these objects during operation of the computer would be too cumbersome. Instead, a signed payload map 274 is used to verify the integrity of the payload objects 272.

When the signed payload container 270 has been opened, the processor 250 checks whether the payload map 274 has a valid signature, by verifying it using the public key 226 on the ROM arrangement 220. If the processor 250 determines that the payload map 274 has a valid signature, the processor 250 downloads the payload map 274 into the payload partition 234 of the fixed storage media 230.

The payload map 274 contains information that the processor 250 can use for verification of the integrity of the payload objects 272 during the booting process. This information may be created by applying a suitable algorithm to the objects, and may e.g. be a hash sum for selected essential objects among the payload objects 272. Any known algorithm may be used, such as e.g. the hash sum algorithms SHA-256 or MD-5. It may not be necessary for the payload map 274 to contain information about all the payload objects 272—only the most essential objects can be selected.

Before downloading the payload objects 272 into the payload partition 234 of the fixed storage media 230, the processor 250 may verify the integrity of the payload objects 272 by applying the same algorithm and checking that the same result is generated as in the payload map 274.

When the payload objects 272 and the signed payload map 274 have been downloaded into the fixed storage media 230, and the payload has been initialized by the processor 250, the payload is run from the fixed storage media 230 until it is replaced or updated. At each subsequent booting of the computer unit, the integrity of the payload objects 272 is verified by the processor 250 by comparing the payload map 274 to the payload objects 272 using the same algorithm or algorithms as was used for creating the payload map 274. This functionality may e.g. be comprised in the RSMBA 268, and it may also be comprised e.g. in the FSMBA 238.

If any of the selected essential payload objects 272 has been tampered with, the payload map 274 will no longer correspond to the payload objects 272. The computer unit may then signal this to the user, so that new payload objects can be installed. According to embodiments, booting is in this case aborted and the computer unit is shut down until new payload objects have been installed. This is appropriate if the payload is essential for the functionality of the computer unit. Another possibility is to select an older version of the payload from the fixed storage media 230, if the system stores older back-up versions. The system may e.g. be arranged to regularly store back-up versions of the payload on the fixed storage media 230, and regularly check these against the payload map 274, so that even if the payload objects 272 would be compromised, there will be an older version available to be run. In this case it may be enough to signal to the user that the latest version of the payload objects 272 have been compromised and that new payload objects 272 should be installed.

According to embodiments, the computer unit will not open any of the payload objects 272 if they are found to be compromised. In this way, no files are run on the computer unit unless the chain of trust has been verified back to the public key 226 on the ROM arrangement 220.

This may also apply to the rest of the booting process. If one step of the booting process is unable to load or verify the next step, booting is stopped and the computer unit is turned off. The computer unit must then be restored by updating the software using a verified removable storage media 260 before it can be started and used again.

If the computer unit has a removable storage media 260 present on a removable media port 240, it is also possible to use this for backing up data. Since the removable storage media 260 can be removed, it can easily be stored in a safe place.

Figure 3:
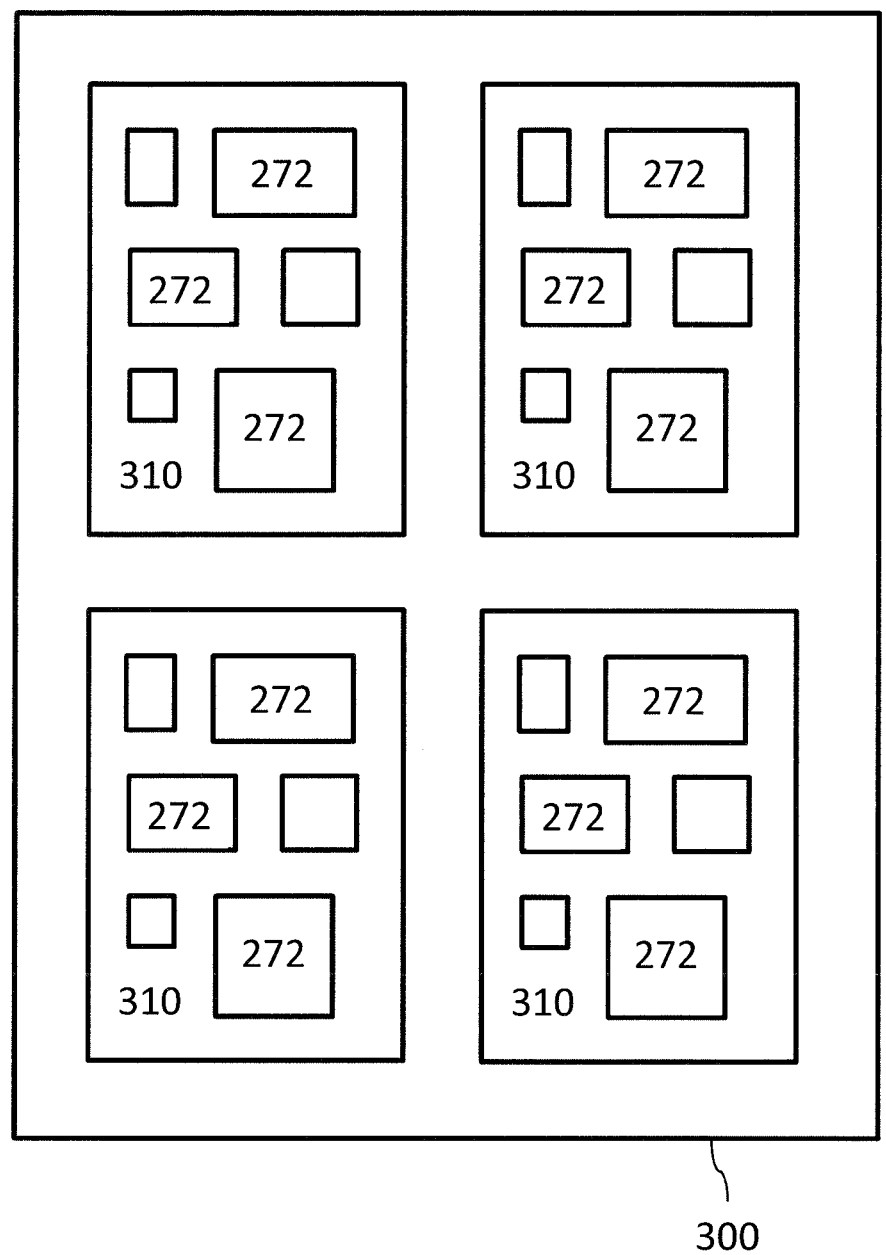
FIG. 3 shows a schematic view of a payload in accordance with of or more embodiments of the disclosure.

FIG. 3 shows a schematic view of a payload 300 in accordance with of or more embodiments of the disclosure. The payload 300 may e.g. be an operating system for the computer unit, and it may comprise a number of payload components 310. These payload components 310 may e.g. relate to different functionalities of the operating system. Each payload component 310 may comprise a number of payload objects 272, which may be of different types and sizes. The payload objects 272 may e.g. files or catalogues. The payload objects 272 are used to implement the functionalities of the payload components 310.

Figure 4:
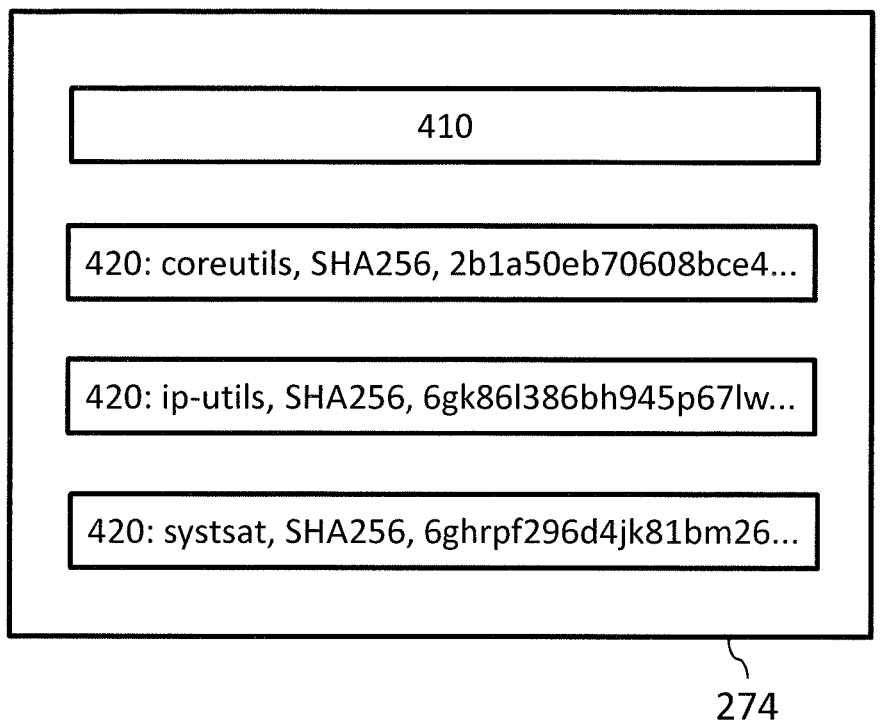
FIG. 4 shows a schematic view of a payload map and a component map in accordance with of or more embodiments of the disclosure.
Figure 4:
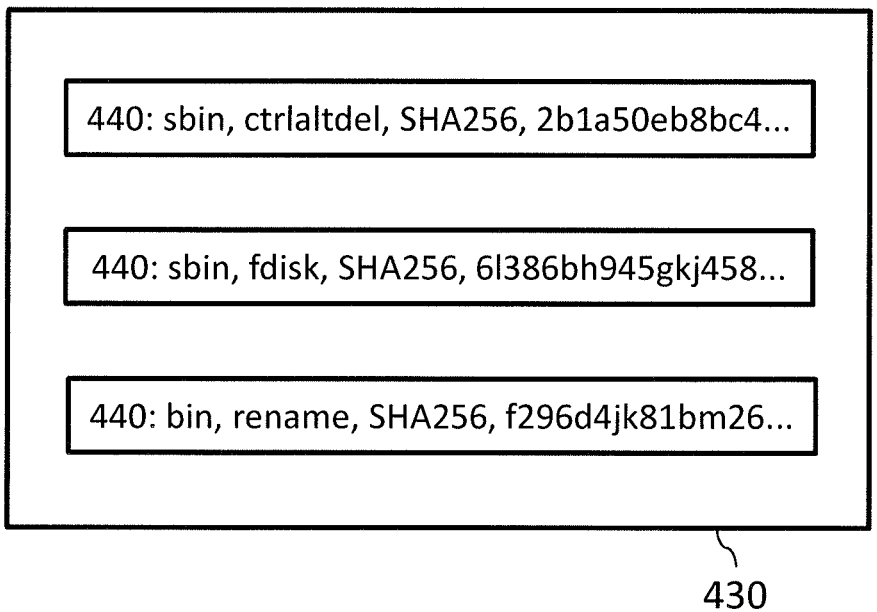

FIG. 4 shows a schematic view of a payload map 274 in accordance with of or more embodiments of the disclosure. The payload map 274 may comprise a signature 410 and a number of payload map entries 420. Each payload map entry 420 may comprise information that the processor 250 can use for verification of the integrity of a payload component 310. This information may be created by applying a suitable algorithm to the payload component 310, and may e.g. be a hash sum for a component map 430. Any known algorithm may be used, such as e.g. the hash sum algorithms SHA-256 or MD-5.

FIG. 4 also shows a schematic view of a component map 430 in accordance with of or more embodiments of the disclosure. There may be a component map 430 for each payload component 310. The component map 430 may comprise a number of component map entries 440. Each component map entry 440 may comprise information that the processor 250 can use for verification of the integrity of a payload object 272. This information may be created by applying a suitable algorithm to the payload object 272, and may e.g. be a hash sum for the payload object 272. Any known algorithm may be used, such as e.g. the hash sum algorithms SHA-256 or MD-5. It may not be necessary for the component map 430 to have a component map entry 440 for each of the payload objects 272 relating to the payload component 310—only the most essential payload objects 272 can be selected.

When a payload map 274 is generated, the payload objects 272 which are considered essential enough to be verified are first selected. These payload objects 272 may e.g. be listed for each payload component 310. A suitable algorithm is then selected for each of the payload objects 272. The same algorithm may be used for all payload objects 272, or a number of different algorithms may be used. For each selected payload object 272, the selected algorithm is applied, and the result is listed in a component map entry 440, which may e.g. be in the format

OBJECT-TYPE, ATTRIBUTES, ALGORITHM, PAYLOAD OBJECT HASH so that the component map entry 440 specifies which payload object 272 the component map entry 440 relates to, which algorithm has been used to generate the information, and the generated information (the hash sum in the example).

When all the component maps 430 have been generated, a suitable algorithm is then selected for each component map 430. The same algorithm may be used for all component maps 430, or a number of different algorithms may be used. For each component map 430, the selected algorithm is applied, and the result is listed in a payload map entry 420, which may e.g. be in the format

COMPONENT, ALGORITHM, COMPONENT MAP HASH so that the payload map entry 420 specifies which payload component 310 the payload map entry 420 relates to, which algorithm has been used to generate the information, and the generated information (the hash sum in the example).

When the integrity of the payload objects 272 are verified against the payload map 274, it is possible to first verify the integrity of the each of the components 310 against each of the payload map entries 420. When the integrity of all the components 310 have been verified, the integrity of each of the selected payload objects 272 are verified against each of the components map entries 440. This makes the verification more efficient, since it is not necessary to verify the integrity of the selected payload objects 272 unless the integrity of the components 310 can been verified.

The payload map entries 420 do not necessarily comprise information that the processor 250 can use for verification of the integrity of a payload component 310, but may instead comprise information that the processor 250 can use for verification of the integrity of a payload object 272, as explained above for the components map entries 440. In this case, no component maps 430 are needed. More layers of maps are also possible, by e.g. grouping functionalities.

Figure 5:
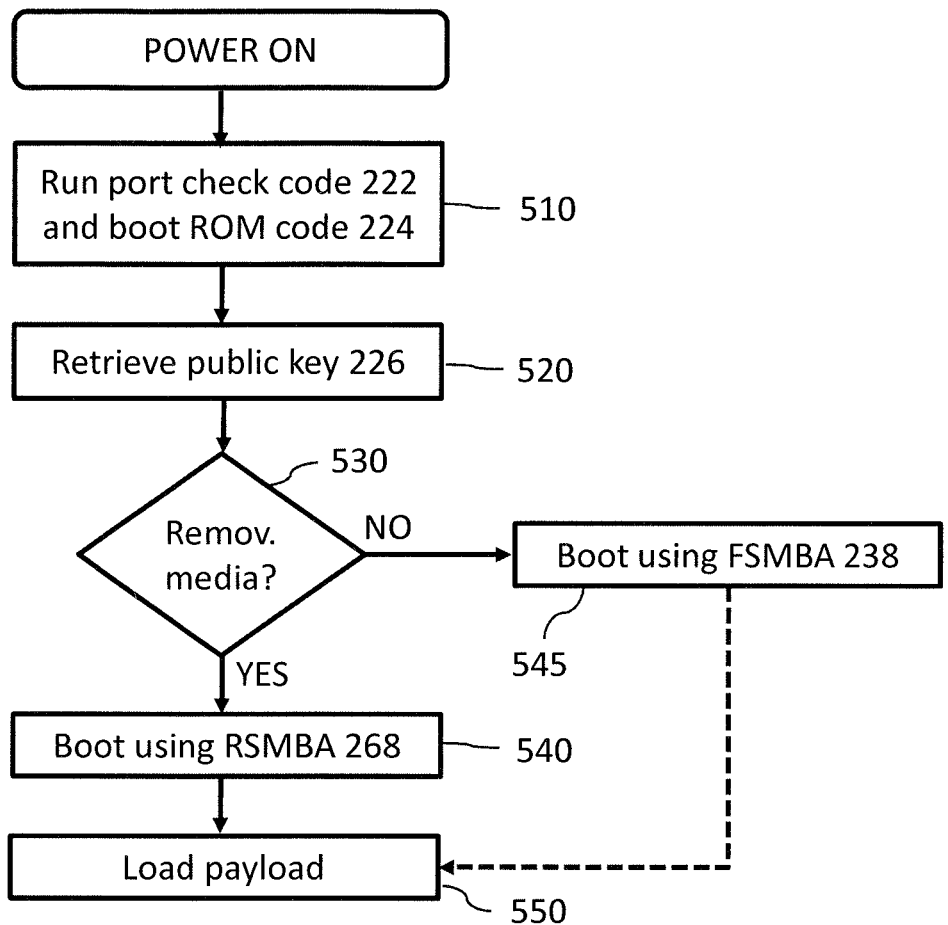
FIG. 5 shows a schematic flow chart of a booting method in accordance with of or more embodiments of the disclosure.

FIG. 5 shows a schematic flow chart of a booting method in accordance with of or more embodiments of the disclosure. When the power has been turned on for the computer unit, the processor 250 starts running the port check code 222 and the bot ROM code 224, in a step 510. The processor 250 then retrieves the public key 226 from the ROM arrangement 220, in a step 520, and checks whether a removable storage media 260 is present on a removable media port 240, in a step 530. These steps may take place in any order.

If a removable storage media 260 is present on a removable media port 240, the processor 250 boots the computer using the RSMBA 268, in a step 540. The booting in the step 540 comprises loading any objects present on the removable storage media 260 into the internal volatile memory 210, checking whether the objects have a valid signature by verifying them using the public key 226, and, if they have a valid signature and comprises a RSMBA 268, booting the computer unit using the RSMBA 268 from the removable storage media 240.

If no removable storage media 260 is present on any of the removable media ports 240, the processor 250 instead boots the computer unit using the FSMBA 238, in a step 545.

After this initial booting, the booting process continues by loading the payload, in a step 550, into the internal volatile memory 210.

Figure 6:
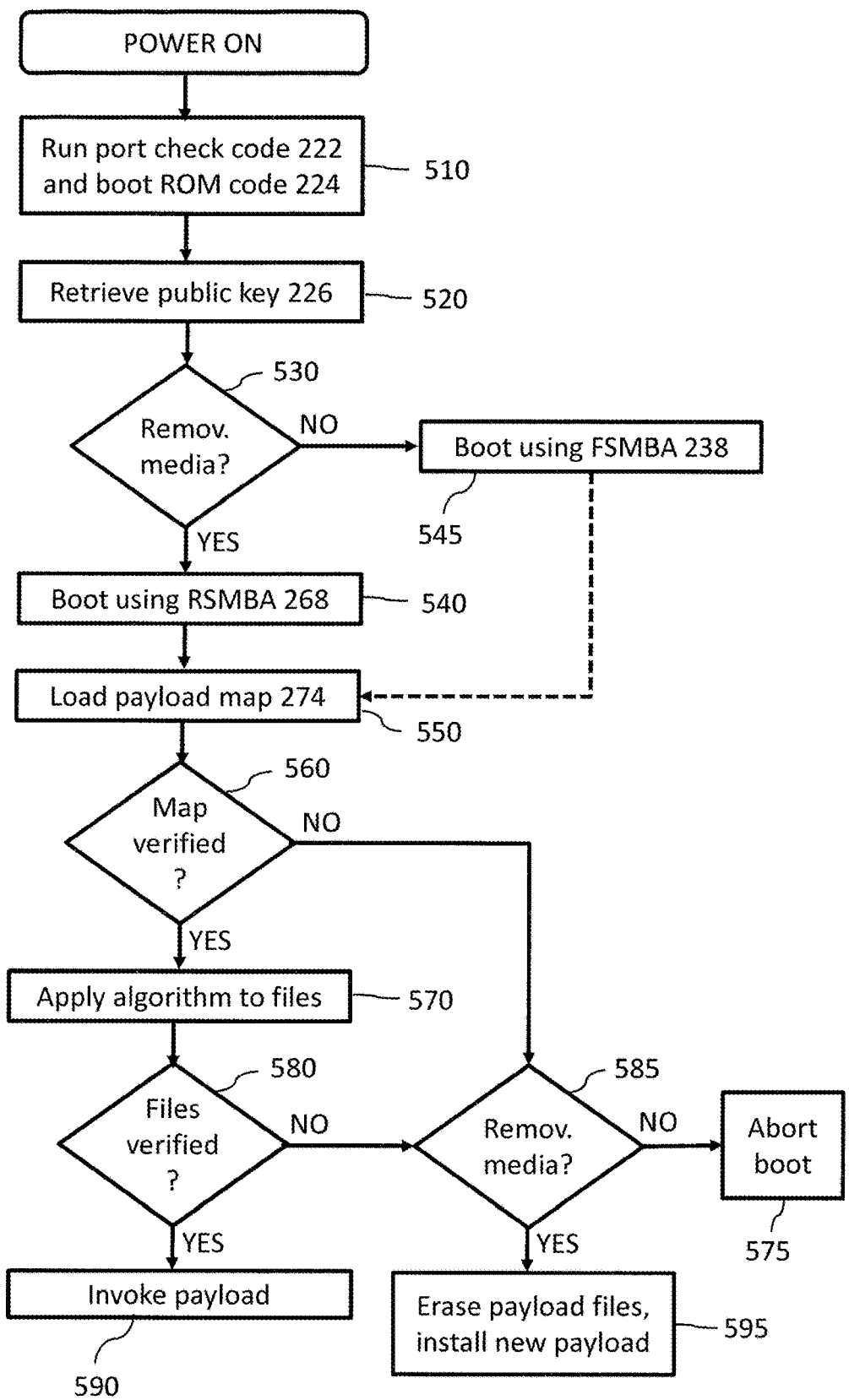
FIG. 6 shows a schematic flow chart of a booting method in accordance with of or more embodiments of the disclosure.

FIG. 6 shows a schematic flow chart of a booting method in accordance with of or more embodiments of the disclosure. When the power has been turned on for the computer unit, the processor 250 starts running the port check code 222 and the bot ROM code 224, in a step 510. The processor 250 then retrieves the public key 226 from the ROM arrangement 220, in a step 520, and checks whether a removable storage media 260 is present on a removable media port 240, in a step 530. These steps may take place in any order.

If a removable storage media 260 is present on a removable media port 240, the processor 250 boots the computer using the RSMBA 268, in a step 540. The booting in the step 540 comprises loading any objects present on the removable storage media 260 into the internal volatile memory 210, checking whether the objects have a valid signature by verifying them using the public key 226, and, if they have a valid signature and comprises a RSMBA 268, booting the computer unit using the RSMBA 268 from the removable storage media 240.

If no removable storage media 260 is present on any of the removable media ports 240, the processor 250 instead boots the computer unit using the FSMBA 238, in a step 545.

After this initial booting, the booting process continues by loading the payload map 274, in a step 550, into the internal volatile memory 210. The processor 250 checks whether the payload map 272 has a valid signature by verifying it using the public key 226, in a step 560. If the payload map 272 has a valid signature, the integrity of the payload objects 272 is verified by the processor 250 by, in a step 570, applying the same algorithm as was used for creating the payload map 274 on the payload objects 272, and, in a step 580, comparing the result to the payload map 274. Different algorithms may be used for different objects, and the payload map 274 may contain information about the algorithm used for each object. The payload map 274 may in embodiments contain information about only some selected essential objects, and in this case only the integrity of these objects are verified.

If the integrity of the payload objects 272 is verified in step 580, the payload is, in a step 590, invoked and the computer unit can start operating.

If the payload map 272 cannot be verified to have a valid signature in step 560, or if the integrity of the payload objects 272 cannot be verified in step 580, the processor checks whether a removable storage media 260 is present on a removable media port 240, in a step 585. If there is a removable storage media 260 is present on a removable media port 240, the processor 250 erases the payload objects 272 and installs a new payload, in a step 595, as described above. This functionality may e.g. be comprised in the RSMBA 268.

If no removable storage media 260 is present on any of the removable media ports 240, the processor 250 instead aborts the booting and shuts down the computer unit, in a step 575.

Figure 7:
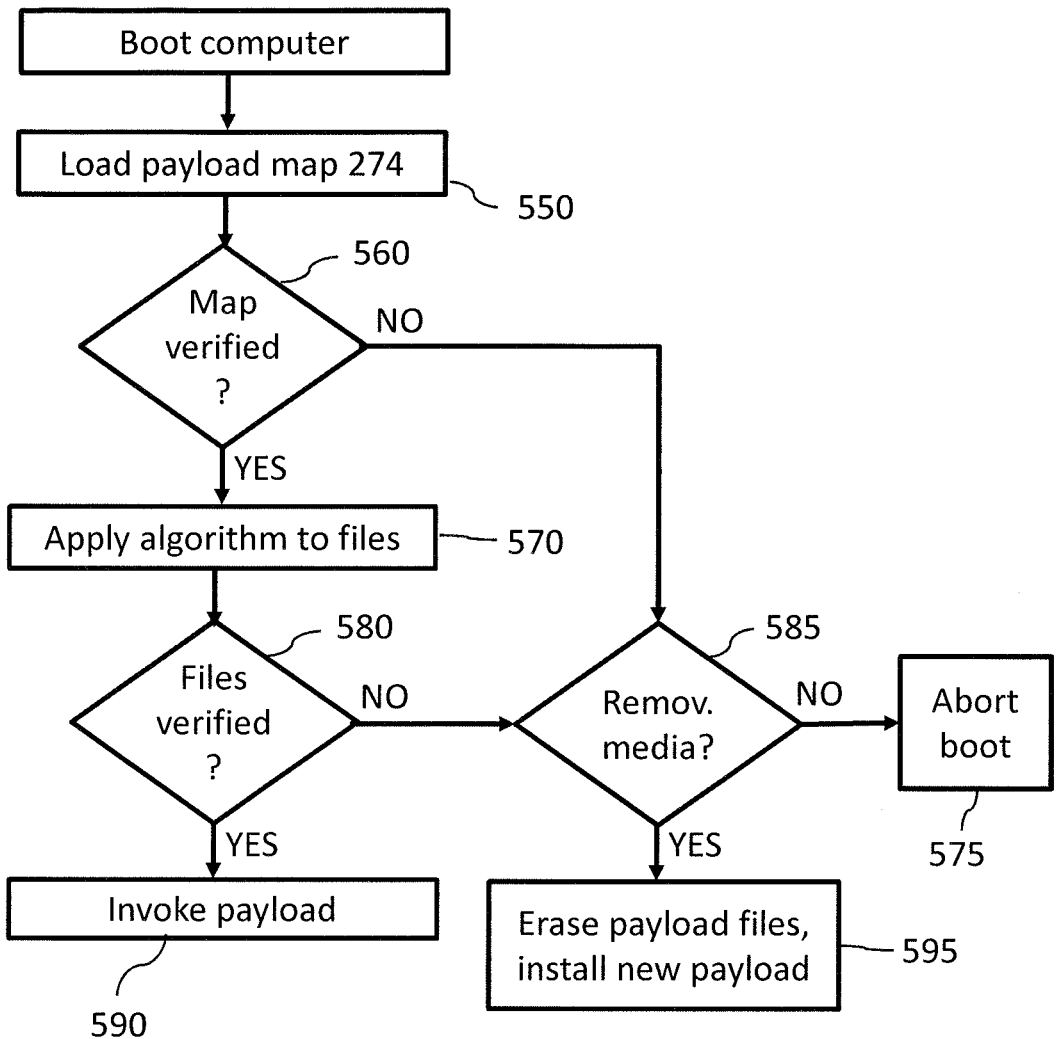
FIG. 7 shows a schematic flow chart of a booting method in accordance with of or more embodiments of the disclosure.

FIG. 7 shows a schematic flow chart of a booting method in accordance with of or more embodiments of the disclosure. First, booting of the computer unit is initiated using any method for initial booting known in the art. After this initial booting, the booting process continues by loading the payload map 274, in a step 550, into the internal volatile memory 210. The processor 250 checks whether the payload map 272 has a valid signature by verifying it using the public key 226, in a step 560. If the payload map 272 has a valid signature, the integrity of the payload objects 272 is verified by the processor 250 by, in a step 570, applying the same algorithm as was used for creating the payload map 274 on the payload objects 272, and, in a step 580, comparing the result to the payload map 274. Different algorithms may be used for different objects, and the payload map 274 may contain information about the algorithm used for each object. The payload map 274 may in embodiments contain information about only some selected essential objects, and in this case only the integrity of these objects are verified.

If the integrity of the payload objects 272 is verified in step 580, the payload is, in a step 590, invoked and the computer unit can start operating.

If the payload map 272 cannot be verified to have a valid signature in step 560, or if the integrity of the payload objects 272 cannot be verified in step 580, the processor checks whether a removable storage media 260 is present on a removable media port 240, in a step 585. If there is a removable storage media 260 is present on a removable media port 240, the processor 250 erases the payload objects 272 and installs a new payload, in a step 595, as described above. This functionality may e.g. be comprised in the RSMBA 268.

If no removable storage media 260 is present on any of the removable media ports 240, the processor 250 instead aborts the booting and shuts down the computer unit, in a step 575.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. For example, other kinds of integrity verification than the described asymmetric algorithm for signature verification using a public key may be used—many different types of integrity verification are known in the art. Also, the steps of the method are not necessarily executed in the order described, and not all the steps described are necessary for the claimed method. Further, the described payload verification method can be applied even if the described method for initial booting is not applied. Accordingly, the scope of the invention is defined only by the claims.

The invention claimed is:

1. A computer unit comprising:
a read-only memory (ROM) arrangement comprising port check code and boot ROM code;
an internal memory;
a fixed storage media comprising a fixed storage media boot application (FSMBA);
a removable media port; and
at least one processor,
wherein the at least one processor is adapted to:
use the boot ROM code to start the computer unit;
use the port check code to determine that a removable storage media is present on the removable media port;
use the boot ROM code to load any objects present on said removable storage media into the internal memory;
use the boot ROM code to verify integrity of said objects loaded into the internal memory;
use the boot ROM code to verify that said objects loaded into the internal memory comprise a removable storage media boot application (RSMBA);
boot the computer unit using said RSMBA;
continue operation of the computer unit by loading payload objects from the fixed storage media into the internal memory; and
verify integrity of payload objects on the fixed storage media by:
loading a payload map from the fixed storage media into the internal memory;
verifying integrity of the payload map;
determining algorithm or algorithms used to generate the payload map;
applying said determined algorithm or algorithms to the payload objects and receiving a result;
comparing said result to the payload map; and
verifying the integrity of the payload objects if said result corresponds to the payload map.

2. The computer unit of claim 1, wherein the integrity is verified using an asymmetric algorithm.

3. The computer unit of claim 2, wherein the asymmetric algorithm comprises signature verification using a public key permanently entered into the ROM arrangement.

4. The computer unit of claim 3, wherein the public key is programmed into one of a plurality of one-time programmable read-only memory (PROM) slots.

5. A computer unit comprising a read-only memory (ROM) arrangement, a fixed storage media, at least one processor, and a removable media port,
wherein the ROM arrangement is adapted to:
start the computer unit;
determine whether a removable storage media is present on the removable media port;
verify integrity of any removable storage media boot application (RSMBA) present on said removable storage media; and
boot the computer unit using said RSMBA, and
wherein the at least one processor is adapted to verify integrity of payload objects on the fixed storage media by:
loading a payload map from the fixed storage media into an internal memory;
verifying integrity of the payload map;
determining algorithm or algorithms used to generate the payload map;
applying said determined algorithm or algorithms to the payload objects and receiving a result;
comparing said result to the payload map; and
verifying the integrity of the payload objects if said result corresponds to the payload map.

6. A computer unit comprising a read-only memory (ROM) arrangement, an internal memory, and at least one processor, wherein the at least one processor is adapted to verify integrity of payload objects by:
loading a payload map into the internal memory;
verifying integrity of the payload map;
determining algorithm or algorithms used to generate the payload map;
applying said determined algorithm or algorithms to the payload objects and receiving a result;
comparing said result to the payload map; and
verifying integrity of the payload objects if said result corresponds to the payload map.

7. A method in a computer unit comprising a read-only memory (ROM) arrangement comprising port check code and boot ROM code, an internal memory, a fixed storage media comprising a fixed storage media boot application (FSMBA), a removable media port and at least one processor, the method comprising:
starting the computer unit, using the boot ROM code;
determining that a removable storage media is present on the removable media port, using the port check code;
loading any objects present on said removable storage media into the internal memory, using the boot ROM code;
verifying integrity of said objects loaded into the internal memory, using the boot ROM code;
verifying that said objects loaded into the internal memory comprise a removable storage media boot application (RSMBA), using the boot ROM code;
booting the computer unit, using the RSMBA;
continuing operation of the computer unit by loading payload objects from the fixed storage media into the internal memory; and
verify integrity of payload objects on the fixed storage media by:
loading a payload map from the fixed storage media into the internal memory;
verifying integrity of the payload map;
determining algorithm or algorithms used to generate the payload map;
applying said determined algorithm or algorithms to the payload objects and receiving a result;

comparing said result to the payload map; and
verifying the integrity of the payload objects if said result corresponds to the payload map.

8. The method of claim 7, wherein the integrity is verified using an asymmetric algorithm.

9. The method of claim 8, wherein the asymmetric algorithm comprises signature verification using a public key permanently entered into the ROM arrangement.

10. The method of claim 9, wherein the public key is programmed into one of a plurality of one-time programmable read-only memory (PROM) slots.

11. A method in a computer unit comprising a read-only memory (ROM) arrangement, a fixed storage media, and a removable media port, the method comprising:
   starting the computer unit;
   determining whether a removable storage media is present on the removable media port;
   verifying integrity of any removable storage media boot application (RSMBA) present on said removable storage media; and
   booting the computer unit using said RSMBA, and
   verifying integrity of payload objects on the fixed storage media by:
      loading a payload map from the fixed storage media into an internal memory;
      verifying integrity of the payload map;
      determining algorithm or algorithms used to generate the payload map;
      applying said determined algorithm or algorithms to the payload objects and receiving a result;
      comparing said result to the payload map; and
      verifying the integrity of the payload objects if said result corresponds to the payload map.

12. A method in a computer unit comprising a read-only memory (ROM) arrangement, an internal memory, and at least one processor, wherein the method comprising:
   loading a payload map into the internal memory;
   verifying integrity of the payload map;
   determining algorithm or algorithms used to generate the payload map;
   applying said determined algorithm or algorithms to the payload objects and receiving a result;
   comparing said result to the payload map; and
   verifying integrity of the payload objects if said result corresponds to the payload map.

* * * * *